United States Patent
Alperin et al.

(10) Patent No.: US 8,214,469 B2
(45) Date of Patent: Jul. 3, 2012

(54) MULTIPLE USE OF COMMON PERSPECTIVES

(75) Inventors: Jordan Alperin, Denver, CO (US); Rich Cerami, Denver, CO (US)

(73) Assignee: Qwest Communications International Inc., Denver, CO (US)

( * ) Notice: Subject to any disclaimer, the term of this patent is extended or adjusted under 35 U.S.C. 154(b) by 672 days.

(21) Appl. No.: 11/400,643

(22) Filed: Apr. 6, 2006

(65) Prior Publication Data

US 2007/0240065 A1   Oct. 11, 2007

(51) Int. Cl.
*G06F 15/177* (2006.01)

(52) U.S. Cl. ......... 709/221; 709/203; 709/217; 709/246

(58) Field of Classification Search .................. 709/221, 709/202–203, 217, 219, 246
See application file for complete search history.

(56) References Cited

U.S. PATENT DOCUMENTS

| | | | |
|---|---|---|---|
| 4,837,798 A | | 6/1989 | Cohen et al. |
| 5,406,557 A | * | 4/1995 | Baudoin ........................ 370/407 |
| 5,410,691 A | * | 4/1995 | Taylor ............................ 707/100 |
| 5,479,411 A | | 12/1995 | Klein |
| 5,524,137 A | | 6/1996 | Rhee |
| 5,633,484 A | * | 5/1997 | Zancho et al. ................. 235/380 |
| 5,689,550 A | | 11/1997 | Garson et al. |
| 5,724,410 A | | 3/1998 | Parvulescu et al. |
| 5,742,905 A | | 4/1998 | Pepe et al. |
| 5,920,835 A | | 7/1999 | Huzenlaub et al. |
| 5,937,162 A | * | 8/1999 | Funk et al. .................... 709/206 |
| 5,974,449 A | | 10/1999 | Chang et al. |
| 6,014,429 A | | 1/2000 | LaPorta et al. |
| 6,081,830 A | | 6/2000 | Schindler |
| 6,094,681 A | | 7/2000 | Shaffer et al. |
| 6,154,772 A | | 11/2000 | Dunn et al. |
| 6,173,259 B1 | | 1/2001 | Bijl et al. |
| 6,345,279 B1 | | 2/2002 | Li et al. |
| 6,366,651 B1 | | 4/2002 | Griffith et al. |
| 6,407,680 B1 | | 6/2002 | Lai et al. |
| 6,421,733 B1 | | 7/2002 | Tso et al. |
| 6,438,221 B1 | | 8/2002 | Lee et al. |
| 6,442,589 B1 | * | 8/2002 | Takahashi et al. ............. 709/203 |
| 6,442,606 B1 | | 8/2002 | Subbaroyan et al. |
| 6,459,776 B1 | | 10/2002 | Aktas et al. |

(Continued)

FOREIGN PATENT DOCUMENTS

WO   WO97/23082   6/1997

OTHER PUBLICATIONS

U.S. Appl. No. 11/228,446, filed Sep. 15, 2005, Jordan Alperin.

(Continued)

*Primary Examiner* — Philip Chea
*Assistant Examiner* — Eric W Shepperd
(74) *Attorney, Agent, or Firm* — Swanson & Bratschun, L.L.C.

(57) ABSTRACT

Systems, methods, and machine-readable media are disclosed to provide common perspectives across multiple end devices of potentially diverse types. In one embodiment, a method of providing common perspectives to multiple end devices can comprise reading one or more common perspectives from a central repository. The one or more common perspectives can define a manner in which the end devices will present data of one or more types. The one or more common perspectives can be applied to selected data and which can then be presented consistent with the one or more common perspectives.

30 Claims, 5 Drawing Sheets

U.S. PATENT DOCUMENTS

| | | | |
|---|---|---|---|
| 6,463,463 B1 | 10/2002 | Godfrey et al. |
| 6,483,899 B2 | 11/2002 | Agraharam et al. |
| 6,556,217 B1 | 4/2003 | Makipaa et al. |
| 6,564,264 B1 | 5/2003 | Creswell et al. |
| 6,675,261 B2 | 1/2004 | Shandony |
| 6,754,904 B1 | 6/2004 | Cooper et al. |
| 6,768,789 B1 | 7/2004 | Wilk |
| 6,775,658 B1 | 8/2004 | Zothner |
| 6,782,253 B1 | 8/2004 | Shteyn et al. |
| 6,799,174 B2 | 9/2004 | Chipman et al. |
| 6,801,793 B1 | 10/2004 | Aarnio et al. |
| 6,816,582 B2 | 11/2004 | Levine |
| 6,826,173 B1 | 11/2004 | Kung et al. |
| 6,826,407 B1 | 11/2004 | Helferich |
| 6,694,004 B1 | 12/2004 | Knoerle et al. |
| 6,832,259 B2 | 12/2004 | Hymel et al. |
| 6,832,377 B1* | 12/2004 | Havemose ............... 718/104 |
| 6,879,838 B2 | 4/2005 | Rankin et al. |
| 6,882,709 B1 | 4/2005 | Sherlock et al. |
| 6,938,087 B1 | 8/2005 | Abu-Samaha |
| 6,964,014 B1 | 11/2005 | Parish |
| 6,977,993 B2 | 12/2005 | Starbuck et al. |
| 6,988,128 B1 | 1/2006 | Alexander et al. |
| 7,013,331 B2 | 3/2006 | Das |
| 7,069,301 B2 | 6/2006 | Jerbi et al. |
| 7,069,309 B1 | 6/2006 | Dodrill et al. |
| 7,072,056 B1 | 7/2006 | Greaves et al. |
| 7,076,734 B2 | 7/2006 | Wolff et al. |
| 7,106,473 B2 | 9/2006 | Sekiguchi |
| 7,120,870 B1 | 10/2006 | Nakamura |
| 7,188,073 B1 | 3/2007 | Tam et al. |
| 7,212,543 B1 | 5/2007 | Arwald et al. |
| 7,212,614 B1 | 5/2007 | Burg et al. |
| 7,219,163 B2 | 5/2007 | Robinson et al. |
| 7,224,774 B1 | 5/2007 | Brown et al. |
| 7,272,662 B2 | 9/2007 | Chesnais et al. |
| 7,295,752 B1 | 11/2007 | Jain et al. |
| 7,310,329 B2 | 12/2007 | Vieri et al. |
| 7,383,308 B1 | 6/2008 | Groves et al. |
| 7,385,875 B2 | 6/2008 | May et al. |
| 7,526,572 B2 | 4/2009 | Omar et al. |
| 7,551,727 B2 | 6/2009 | Howell et al. |
| 7,587,033 B2* | 9/2009 | Crago et al. ............. 379/88.14 |
| 7,596,369 B2 | 9/2009 | Alperin et al. |
| 7,688,962 B1 | 3/2010 | Knoerie et al. |
| 8,078,476 B2 | 12/2011 | Alperin et al. |
| 2001/0013069 A1* | 8/2001 | Shah ............................. 709/238 |
| 2002/0026457 A1 | 2/2002 | Jensen |
| 2002/0032589 A1 | 3/2002 | Shah |
| 2002/0075519 A1 | 6/2002 | Konsella et al. |
| 2002/0076027 A1 | 6/2002 | Bernnan et al. |
| 2002/0082030 A1 | 6/2002 | Berndt et al. |
| 2002/0087704 A1 | 7/2002 | Chesnais et al. |
| 2002/0098831 A1 | 7/2002 | Castell et al. |
| 2002/0102965 A1 | 8/2002 | Mandahl et al. |
| 2002/0111991 A1* | 8/2002 | Wood et al. ................ 709/203 |
| 2002/0128036 A1 | 9/2002 | Yach et al. |
| 2002/0144273 A1 | 10/2002 | Reto |
| 2002/0156871 A1* | 10/2002 | Munarriz et al. ............. 709/219 |
| 2002/0169823 A1 | 11/2002 | Coulombe et al. |
| 2002/0170067 A1 | 11/2002 | Norstrom et al. |
| 2002/0174194 A1 | 11/2002 | Mooney et al. |
| 2002/0194150 A1* | 12/2002 | Bates et al. ...................... 707/1 |
| 2003/0088633 A1 | 5/2003 | Chiu et al. |
| 2003/0097262 A1 | 5/2003 | Nelson |
| 2003/0120717 A1 | 6/2003 | Callaway et al. |
| 2003/0147369 A1 | 8/2003 | Singh et al. |
| 2003/0149646 A1 | 8/2003 | Chen et al. |
| 2003/0172139 A1 | 9/2003 | Srinivasan et al. |
| 2003/0172175 A1 | 9/2003 | McCormack et al. |
| 2004/0044663 A1 | 3/2004 | Horompoly |
| 2004/0054719 A1 | 3/2004 | Daigle et al. |
| 2004/0058673 A1 | 3/2004 | Irlam et al. |
| 2004/0075698 A1 | 4/2004 | Gao et al. |
| 2004/0091089 A1 | 5/2004 | Wynn |
| 2004/0170155 A1 | 9/2004 | Omar et al. |
| 2004/0199665 A1 | 10/2004 | Omar et al. |
| 2004/0268265 A1 | 12/2004 | Berger |
| 2005/0015311 A1 | 1/2005 | Frantz et al. |
| 2005/0015443 A1 | 1/2005 | Levine et al. |
| 2005/0018653 A1 | 1/2005 | Phillips et al. |
| 2005/0033806 A1 | 2/2005 | Harvey et al. |
| 2005/0037762 A1 | 2/2005 | Gurbani et al. |
| 2005/0053206 A1 | 3/2005 | Chingon et al. |
| 2005/0075097 A1 | 4/2005 | Lehikoinen et al. |
| 2005/0086282 A1 | 4/2005 | Anderson et al. |
| 2005/0089149 A1 | 4/2005 | Elias |
| 2005/0091327 A1 | 4/2005 | Koch |
| 2005/0101343 A1 | 5/2005 | Hsiao |
| 2005/0144557 A1 | 6/2005 | Li et al. |
| 2005/0201533 A1 | 9/2005 | Emam et al. |
| 2005/0235307 A1 | 10/2005 | Relan et al. |
| 2005/0246666 A1 | 11/2005 | Kalinoski et al. |
| 2005/0262542 A1 | 11/2005 | DeWeese et al. |
| 2006/0017983 A1* | 1/2006 | Syri et al. ..................... 358/402 |
| 2006/0026302 A1 | 2/2006 | Bennett et al. |
| 2006/0095868 A1 | 5/2006 | Sawada et al. |
| 2006/0104293 A1 | 5/2006 | Kopp et al. |
| 2006/0104430 A1 | 5/2006 | Kirkland et al. |
| 2006/0104431 A1 | 5/2006 | Emery et al. |
| 2006/0123082 A1 | 6/2006 | Digate et al. |
| 2006/0156251 A1 | 7/2006 | Suhail et al. |
| 2006/0168065 A1 | 7/2006 | Martin |
| 2006/0184624 A1 | 8/2006 | Thukral |
| 2006/0218575 A1 | 9/2006 | Blair |
| 2006/0250991 A1 | 11/2006 | Jabri et al. |
| 2006/0265397 A1 | 11/2006 | Bryan et al. |
| 2006/0265427 A1 | 11/2006 | Cohen et al. |
| 2007/0016643 A1 | 1/2007 | Boss et al. |
| 2007/0079010 A1 | 4/2007 | Heredia et al. |
| 2007/0097394 A1 | 5/2007 | Zaima et al. |
| 2007/0139513 A1 | 6/2007 | Fang |
| 2007/0174448 A1 | 7/2007 | Ahuja et al. |
| 2007/0198648 A1 | 8/2007 | Allen et al. |
| 2007/0239833 A1 | 10/2007 | Alperin et al. |
| 2007/0239880 A1 | 10/2007 | Alperin et al. |
| 2007/0239895 A1 | 10/2007 | Alperin et al. |
| 2008/0177616 A1* | 7/2008 | Nemirofsky et al. ........... 705/10 |
| 2011/0167122 A1 | 7/2011 | Groves et al. |

OTHER PUBLICATIONS

U.S. Appl. No. 11/255,089, filed Oct. 19, 2005, Jordan Alperin et al.
U.S. Appl. No. 11/266,011, filed Nov. 2, 2005, Jordan Alperin et al.
U.S. Appl. No. 11/293,028, filed Dec. 2, 2005, Jordan Alperin et al.
U.S. Appl. No. 11/292,801, filed Dec. 2, 2005, Jordan Alperin et al.
U.S. Appl. No. 11/399,096, filed Apr. 5, 2006, Jordan Alperin et al.
U.S. Appl. No. 11/399,585, filed Apr. 5, 2006, Jordan Alperin et al.
U.S. Appl. No. 11/399,097, filed Apr. 5, 2006, Jordan Alperin et al.
U.S. Appl. No. 11/399,098, filed Apr. 5, 2006, Jordan Alperin et al.
U.S. Appl. No. 11/399,584, filed Apr. 5, 2006, Jordan Alperin.
U.S. Appl. No. 11/400,616, filed Apr. 6, 2006, Jordan Alperin et al.
U.S. Appl. No. 11/400,644, filed Apr. 6, 2006, Jordan Alperin et al.
U.S. Appl. No. 11/383,620, filed May 16, 2006, Jordan Alperin.
Good Technology, Inc., "Goodlink Enterprise Edition 4.5", Published in: US, Product Brochure, 4 pages.
Koontz, Alan "Find in Page Script", Oct. 13, 1969, Dynamic Drive, "http:/www.dynamicdrive.com/dynamicindex11/findpage.htm", 2 pages.
The Web Design Resource, "Manipulating Font Size and Color", Jun. 27, 1998, The Web Design Resource, 2 pages.
U.S. Appl. No. 11/228,446, Advisory Action dated Jan. 8, 2009, 3 pages.
U.S. Appl. No. 11/228,446, Advisory Action dated Oct. 1, 2009, 3 pages.
U.S. Appl. No. 11/228,446, Final Office Action dated May 18, 2010, 15 pages.
U.S. Appl. No. 11/228,446, Final Office Action dated Jul. 24, 2009, 11 pages.
U.S. Appl. No. 11/228,446, Final Office Action dated Oct. 24, 2008, 6 pages.
U.S. Appl. No. 11/228,446, Office Action dated Jan. 4, 2010, 17 pages.
U.S. Appl. No. 11/228,446, Office Action dated Jun. 3, 2008, 13 pages.

U.S. Appl. No. 11/228,446, Office Action dated Mar. 3, 2009, 12 pages.
U.S. Appl. No. 11/255,089, Final Office Action dated Sep. 24, 2009.
U.S. Appl. No. 11/255,089, Appeal Brief dated Apr. 26, 2010, 17 pages.
U.S. Appl. No. 11/255,089, Advisory Action dated Dec. 15, 2009, 3 pages.
U.S. Appl. No. 11/255,089, Office Action dated Mar. 10, 2009, 17 pages.
U.S. Appl. No. 11/255,089, Office Action dated Oct. 8, 2008, 18 pages.
U.S. Appl. No. 11/266,011, Office Action dated Dec. 22, 2008, 12 pages.
U.S. Appl. No. 11/266,011, Office Action dated Aug. 19, 2010, 19 pages.
U.S. Appl. No. 11/266,011, Advisory Action dated Apr. 23, 2010, 2 pages.
U.S. Appl. No. 11/266,011, Office Action dated Jun. 10, 2009, 12 pages.
U.S. Appl. No. 11/266,011, Final Office Action dated Jan. 28, 2010, 11 pages.
U.S. Appl. No. 11/292,801, Office Action dated Mar. 3, 2009, 9 pages.
U.S. Appl. No. 11/293,028, Advisory Action dated Jul. 6, 2009, 19 pages.
U.S. Appl. No. 11/293,028, Advisory Action dated May 23, 2008., 3 pages.
U.S. Appl. No. 11/293,028, Final Office Action dated Apr. 15, 2009, 12 pages.
U.S. Appl. No. 11/293,028, Final Office Action dated Mar. 17, 2008, 11 pages.
U.S. Appl. No. 11/293,028, Office Action dated Aug. 13, 2008, 9 pages.
U.S. Appl. No. 11/293,028, Office Action dated Nov. 14, 2007, 11 pages.
U.S. Appl. No. 11/293,028, Notice of Allowance dated Oct. 30, 2009, 16 pages.
U.S. Appl. No. 11/399,096, Final Office Action dated Jun. 17, 2009, 11 pages.
U.S. Appl. No. 11/399,096, Office Action dated Dec. 7, 2009, 10 pages.
U.S. Appl. No. 11/399,096, Office Action dated Jan. 22, 2009, 14 pages.
U.S. Appl. No. 11/399,096, Final Office Action dated May 24, 2010, 12 pages.
U.S. Appl. No. 11/399,098, Notice of Allowance dated Jun. 2, 2009, 6 pages.
U.S. Appl. No. 11/399,098, Office Action dated Aug. 25, 2008, 13 pages.
U.S. Appl. No. 11/399,098, Terminal Disclaimer dated Nov. 25, 2008, 1 page.
U.S. Appl. No. 11/399,098, Requirement for Election/Restriction dated Feb. 25, 2009, 6 pages.
U.S. Appl. No. 11/399,098, Response to Requirement for Election/Restriction dated Mar. 11, 2009, 10 pages.
U.S. Appl. No. 11/399,098, filed Apr. 5, 2006, now US Patent No. 7,596,369, 16 pages.
U.S. Appl. No. 11/399,585, Office Action dated Mar. 24, 2009, 16 pages.
U.S. Appl. No. 11/399,585, Advisory Action dated Jan. 25, 2010, 3 pages.
U.S. Appl. No. 11/399,585, Final Office Action dated Nov. 4, 2009, 10 pages.
U.S. Appl. No. 11/399,585, Non-Final Office Action dated Sep. 21, 2010, 15 pages.
U.S. Appl. No. 11/400,616, Final Office Action dated Feb. 1, 2010, 16 pages.
U.S. Appl. No. 11/400,616, Office Action dated Jul. 13, 2009, 21 pages.
U.S. Appl. No. 11/400,644, Office Action dated Jan. 21, 2009, 16 pages.
WWW.COMCAST.NET/STORAGE, "Comcast on Line Storage", 2005, Published in: US, Internet Website, 1 page.
WWW.IBACKUP.COM, "Flexible Storage Solutions for the Internet Age", Nov. 2005, Published in: US, Internet Website, 1 page.
WWW.MYDOCSONLINE, "File and Data Storage", Nov. 2005, Published in: US, Internet Website, 2 pages.
WWW.STREAMLOAD.COM, "Streamload—Freedom for Your Digital Lifestyle", Nov. 2005, Published in: US, Internet Website, 1 page.
WWW.XDRIVE.COM, "Secure on Line Storage", Nov. 2005, Published in : US, Internet Website, 2 pages.
U.S. Appl. No. 11/399,096, Office Action dated Oct. 27, 2010, 11 pages.
U.S. Appl. No. 11/399,097, Final Office Action dated Sep. 1, 2010, 10 pages.
U.S. Appl. No. 11/399,097, Office Action dated Mar. 26, 2010, 12 pages.
U.S. Appl. No. 11/399,097, Requirement for Election/Restriction dated Jan. 26, 2010, 6 pages.
U.S. Appl. No. 11/399,097, Response to Requirement for Election/Restriction dated Feb. 22, 2010, 1 page.
U.S. Appl. No. 11/399,584, Examiner's Answer to Appeal Brief dated Jun. 22, 2009, 16 pages.
U.S. Appl. No. 11/399,584, Appeal Brief dated Mar. 12, 2009, 24 pages.
U.S. Appl. No. 11/399,584, Advisory Action dated Dec. 18, 2008, 3 pages.
U.S. Appl. No. 11/399,584, Final Office Action dated Sep. 12, 2008, 12 pages.
U.S. Appl. No. 11/399,584, Office Action dated Mar. 6, 2008, 10 pages.
U.S. Appl. No. 11/383,620, Office Action dated Nov. 9, 2010, 17 pages.
U.S. Appl. No. 11/383,620, Final Office Action dated May 14, 2010, 20 pages.
U.S. Appl. No. 11/383,620, Office Action dated Nov. 10, 2009, 15 pages.
U.S. Appl. No. 11/383,620, Office Action dated Apr. 2, 2009, 14 pages.
U.S. Appl. No. 11/223,065, Office Action dated Sep. 15, 2010, 10 pages.
U.S. Appl. No. 11/302,980, Advisory Action dated Apr. 8, 2010, 2 pages.
U.S. Appl. No. 11/302,980, Office Action dated Jan. 26, 2010, 11 pages.
U.S. Appl. No. 11/302,980, Office Action dated Sep. 14, 2010, 11 pages.
U.S. Appl. No. 11/383,620, Final Office Action dated Mar. 28, 2011, 27 pages.
U.S. Appl. No. 11/399,585, Final Office Action dated Feb. 8, 2011, 23 pages.
U.S. Appl. No. 11/266,011, Final Office Action dated Feb. 4, 2011, 25 pgs.
U.S. Appl. No. 11/399,096, Final Office Action dated Feb. 11, 2011, 15 pages.
U.S. Appl. No. 11/228,446, Office Action dated Feb. 22, 2011, 20 pages.
Alan Koontz, "Find in Page Script", Jun. 2003, Dynamic Drive, http://www.dynamicdrive.com/dynamicindeIDS 3/22/1111/findpage.htm, 7 pages.
Brian Suda et al., "Enhance Usability by Highlighting Search Terms," A List Apart, http://www.alistapart.com/articles/searchhighlight, 4 pages, Aug. 10, 2004.
Chris McC, "Determining if span/div is visible or not," Jun. 2004, JavaScript and AJAIDS Mar. 22, 2011 Forum, http://www.webmasterworld.com/forum91/1935.htm, 4 pages.
Vic Phillips, web site "http://homepgae.ntlworld.com/vwphillips/SearchForTeIDS 3/22/11t.htm" titled "JavaScript Code for Search for TeIDS 3/22/11t", Jan. 15, 2005.
Ashok Hariharan, "DHTML TeIDS 3/22/11t Marker—An EIDS Mar. 22, 2011periment," Jul. 2002; evolt.org, http://evolt.org/node/29028, 8 pages.
U.S. Appl. No. 11/400,616, Office Action dated Mar. 16, 2011, 16 pages.

U.S. Appl. No. 11/399,096, Notice of Panel Decision from Pre-Appeal Brief Review dated May 23, 2011, 2 pages.
U.S. Appl. No. 11/399,096, Office Action dated Jul. 12, 2011, 14 pages.
U.S. Appl. No. 11/399,585, Office Action dated Jul. 18, 2011, 20 pages.
U.S. Appl. No. 11/400,616 Non-Final Office Action dated Aug. 18, 2011; 35 pages.
U.S. Appl. No. 11/399,097; Notice of Allowance dated Jul. 29, 2011; 20 pages.
U.S. Appl. No. 11/399,097; Notice of Allowance dated Aug. 23, 2011; 5 pages.
U.S. Appl. No. 11/383,620, Final Office Action dated Aug. 31, 2011, 28 pages.
U.S. Appl. No. 11/228,446; Examiner-Initiated interview Summary dated Nov. 10, 2011; 2 pages.
U.S. Appl. No. 11/228,446; Interview Summary dated Nov. 28, 2011; 3 pages.
U.S. Appl. No. 11/228,446; Notice of Allowance dated Nov. 28, 2011; 17 pages.
U.S. Appl. No. 11/399,096; Final Office Action dated Dec. 6, 2011; 15 pages.
U.S. Appl. No. 11/399,585; Non Final Office Action dated Jan. 4, 2012; 19 pages.
U.S. Appl. No. 11/266,011; Notice of Allowance dated Oct. 7, 2011; 18 pages.
U.S. Appl. No. 11/399,097; Supplemental Notice of Allowability dated Oct. 31, 2011; 5 pages.
U.S. Appl. No. 11/399,097; Issue Notification dated Nov. 22, 2011; 1 page.
U.S. Appl. No. 11/383,620; Final Office Action dated Feb. 3, 2012; 18 pages.
U.S. Appl. No. 11/399,584; Decision on Appeal dated Feb. 9, 2012; 9 pages.

* cited by examiner

MULTIPLE USE OF COMMON PERSPECTIVES

CROSS REFERENCE TO RELATED APPLICATIONS

This application is related to co-pending U.S. patent application Ser. No. 11/255,089 entitled "Cross-Platform Support for a Variety of Media Types" filed Oct. 19, 2005, and U.S. patent application Ser. No. 11/293,028 entitled "Propagation of User Preferences to End Devices" filed Dec. 2, 2005 both of which are herein incorporated by reference.

BACKGROUND OF THE INVENTION

Embodiments of the present invention relate generally to communications networks and more particularly to providing common user interface perspectives to multiple end devices of potentially diverse types.

Today it is very common, and probably the norm, for an individual to have and regularly use a number of communications devices of different types that communicate via a variety of different media. For example, an individual may, on a daily basis, use a number of different telephones such as a work line, a home line, one or more cell phones, etc. Additionally, this same individual may have and use a number of other communication devices and/or media such as one or more email accounts, one or more instant message accounts, etc. that are accessible through any of a number of different devices such as personal computers various portable devices, and/or other network attached devices that communicate via the Internet or other network.

While the availability of these devices helps people stay in touch and communicate, it can present problems. For one, each device has its own settings and/or user defined preferences. However, an individual using a number of communication devices may have some user preference settings that he wants to set on all of his devices. For example, a user may wish to view available data in a common manner, i.e., view a common perspective, between multiple devices. That is, a user may like to view his emails or other communications in a particular arrangement, such as arranged chronologically by the time they were received, by senders name, by subject, by content, or by some combination of these or other criteria. Furthermore, the user may wish this view to be common throughout the various devices he may use to view such data. For example, the user may want a particular perspective on his communications to be applied not only to his PC or browser, but also to his cell phone, PDA, or other device(s) when using those devices to view the same information or same type of information.

Currently, there is no way for a user of multiple end devices of different types to share or set perspectives that are common to all or some subset of all of these devices. Rather, the user is left with the tedious and time consuming task of setting these perspectives individually in each device. Compounding this problem is the fact that some devices have user interfaces that are less friendly than others. For example, a user's cell phone may provide a user interface that is effective for making telephone calls but this interface is not easy to use for most other purposes. However, a PC's interface is generally very user friendly and effective for performing a wide variety of tasks. Therefore a user may prefer to use his PC to set one or more perspectives for viewing information. However, there is currently no way for the user to then apply these perspectives to another device such as his cell phone or PDA. Hence, there is a need for methods and systems that allow for common perspectives across multiple devices of potentially diverse types.

BRIEF SUMMARY OF THE INVENTION

Systems, methods, and machine-readable media are disclosed to provide common perspectives across multiple end devices of potentially diverse types. In one embodiment, a method of providing common perspectives to multiple end devices can comprise reading one or more common perspectives from a central repository. The one or more common perspectives can define a manner in which the end devices will present data of one or more types. The one or more common perspectives can be applied to selected data and which can then be presented consistent with the one or more common perspectives.

According to one embodiment, a determination can be made as to whether one or more common perspectives are available. Alternatively or additionally, a determination can be made as to whether multiple common perspectives are available. In response to determining that multiple common perspectives are available, an indication of each of the multiple common perspectives can be presented to a user for selection of one or more of the multiple common perspectives. A user selection of one or more common perspectives from available common perspectives can be read and the user selected common perspectives can be applied to the selected data.

According to another embodiment, applying the one or more common perspectives to the selected data can comprise performing a search on the selected data using one or more criteria provided by the one or more common perspectives. In some cases, prior to applying the one or more common perspectives, the selected data can also be read from the central repository.

According to yet another embodiment, a local perspective defined by a user of one of the end devices can be read. The local perspective can be saved in the central repository as a common perspective. In some cases, the local perspective can comprise a currently active perspective, i.e., a perspective currently being used or viewed by the user of the end device. According to a further embodiment, prior to saving the local perspective in the central repository, the user can be queried as to whether to save the local perspective as a common perspective. In such a case, a response can be received from the user indicating whether to save the local perspective in the central repository as a common perspective and the local perspective can be saved in the central repository as a common perspective in response to the user response.

According to still another embodiment, a system for providing common perspectives to multiple end devices can comprise a communications bus and a user profile database communicatively coupled with the communications bus. The user profile database can be adapted to store therein user preference information for one or more of a plurality of users. The user preference information can include one or more common perspectives, each common perspective defining a manner in which data of one or more types can be presented.

According to one embodiment, the system can also include a first end device of a first type communicatively coupled with the communications bus. The first device can be adapted to read a local perspective defined by a user of the first device and save the local perspective in the user profile database as a common perspective. In some cases, the first end device can be further adapted to query the user as to whether to save the local perspective as a common perspective prior to saving the local perspective in the central repository. In such a case, the first end device is further adapted to receive a response from the user indicating whether to save the local perspective in the central repository as a common perspective and save the local perspective in the central repository as a common perspective in response to the user response.

According to yet another embodiment, the system can also include a second end device of a second type communicatively coupled with the communications bus. The second end device can be adapted to read one or more common perspectives from the user profile database, apply the one or more common perspectives to selected data, and present the selected data consistent with the one or more common perspectives. In some cases, the second end device can be further adapted to read the selected data from the central repository prior to applying the one or more common perspectives. According to one embodiment, the second end device can be further adapted to determine whether one or more common perspectives are available. Additionally or alternatively, the second end device can be further adapted to determine whether multiple common perspectives are available. In such a case, the second end device can be further adapted to present an indication of each of the multiple common perspectives to a user of the second end device for selection of one or more of the multiple common perspectives in response to determining multiple common perspectives are available. The second end device can be further adapted to read a user selection of one or more common perspectives from the available common perspectives and apply the user selected common perspectives.

According to still another embodiment, a machine-readable medium can have stored thereon a series of instructions that, when executed by a processor, cause the processor to provide common perspectives to multiple end devices by reading one or more common perspectives from a central repository. The one or more common perspectives can define a manner in which the end devices will present data of one or more types. The one or more common perspectives can be applied to selected data and which can then be presented consistent with the one or more common perspectives.

DETAILED DESCRIPTION OF THE INVENTION

In the following description, for the purposes of explanation, numerous specific details are set forth in order to provide a thorough understanding of various embodiments of the present invention. It will be apparent, however, to one skilled in the art that embodiments of the present invention may be practiced without some of these specific details. In other instances, well-known structures and devices are shown in block diagram form.

Embodiments of the present invention provide methods, system and machine-readable media for providing common perspectives to multiple end devices of potentially diverse types. In one embodiment, providing common perspectives to multiple end devices can comprise reading one or more common perspectives from a central repository. The one or more common perspectives can define a manner in which the end devices will present data of one or more types. The one or more common perspectives can be applied to selected data and which can then be presented consistent with the one or more common perspectives. That is, the central repository can store one or more perspectives that can be read by end devices and applied to data being viewed or otherwise handled by that end device.

As will be seen, according to one embodiment, a local perspective defined by a user of one of the end devices can be read. The local perspective can be saved in the central repository as a common perspective. In some cases, the local perspective can comprise a currently active perspective, i.e., a perspective currently being used or viewed by the user of the end device. That is, a user of one end device can save a perspective that he is currently using or defining. This perspective can then be used by other end devices, probably but not necessarily other end devices of the same user, as common perspectives. In this way, the user can use one end device, such as his PC, to define a perspective that can be used by his other end devices, such as a cell phone PDA, etc.

Figure 1:
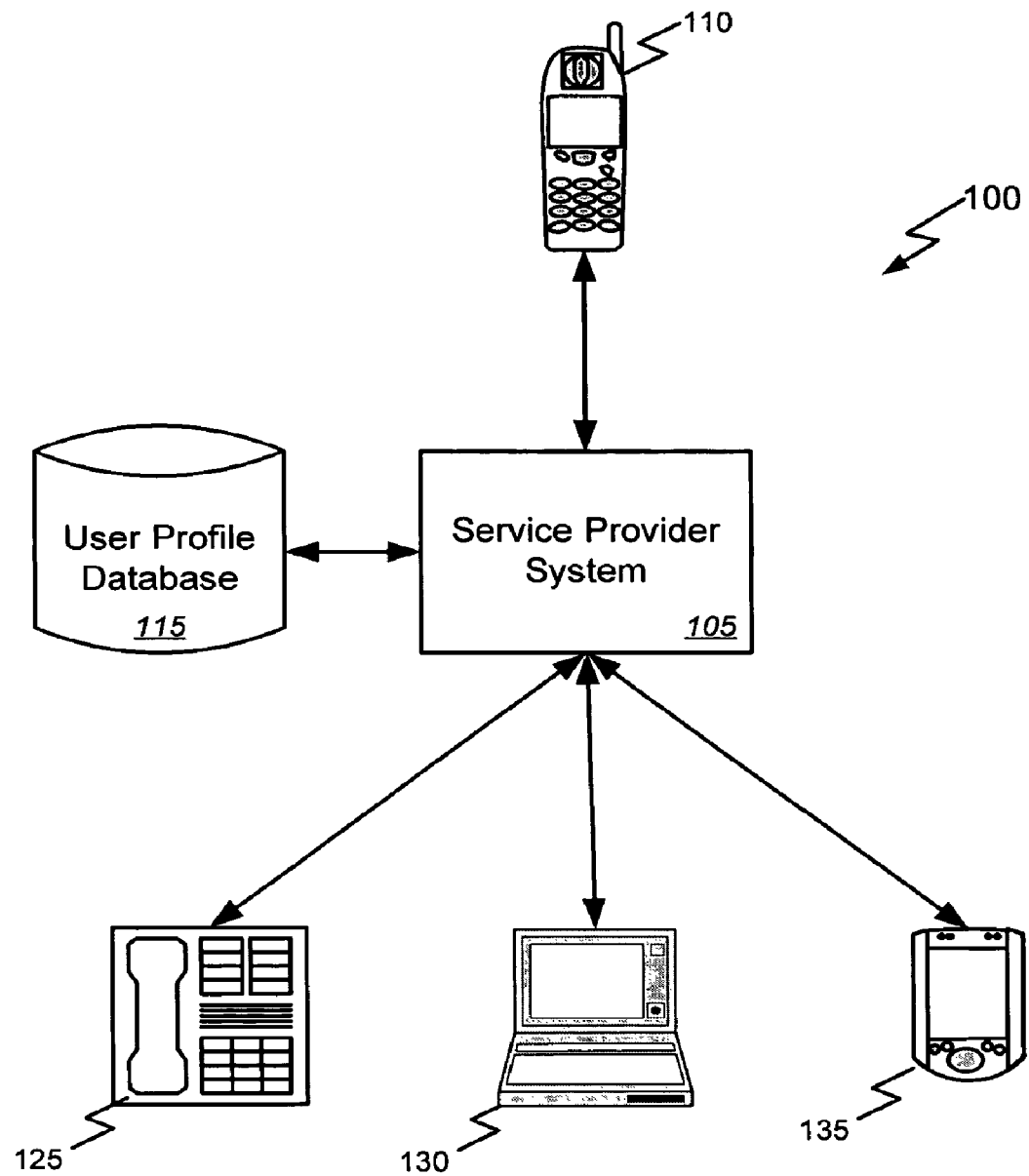
FIG. 1 is a block diagram illustrating, at a high-level, functional components of an architecture for providing common perspectives to multiple end devices of potentially diverse types according to one embodiment of the present invention.

FIG. 1 is a block diagram illustrating, at a high-level, functional components of an architecture for providing common perspectives to multiple end devices of potentially diverse types according to one embodiment of the present invention. In this example, the system 100 includes an initiating device 110 communicatively coupled with a service provider system 105. The service provider system 105 can be communicatively coupled with a user profile database 115 and a plurality of recipient devices 120-135.

Initiating device 110 can be any of a number of possible communication devices. While illustrated here as resembling a laptop computer, initiating device 110 can also be a cell phone, a Personal Digital Assistant (PDA), any of a variety of wireless devices, a personal computer, etc. Regardless of the exact type of device, initiating device 110 can be communicatively coupled with service provider system 105 via typical communication media such as a cellular network, a land line telephone, a Local Area Network (LAN), Wide Area Network (WAN), the Internet, or other type of network. Through this communication media, initiating device 110 can send and receive communications to and from the service provider system 105.

Service provider system 105 can be one or more systems adapted to provide communications services of one or more types to the initiating device 110. For example, service provider system 105 can be a system providing cellular telephone services, land line telephone services, Internet services, etc. Service provider system 105 can be adapted to send and receive communications of an appropriate type to and from initiating device 110.

User profile database 115 can be communicatively coupled with service provider system 105 via a Local Area Network (LAN), Wide Area Network (WAN), the Internet, or other type of network or other communications media. While user profile database 115 is shown in this example as being separate from the service provider system 105, the user profile database may be internal or external to the service provider system 105 or may be part of and/or maintained by another system and may be either local to or remote from the service provider system 105. Regardless of the exact configuration, user profile database 115 maintains a set of user profile data or preferences for one or more users of the service provider system 105 such as a user of initiating device 110 and/or users of recipient devices 120-135. As will be seen, such information can include a number of common perspectives for use by end devices when displaying or otherwise handling data of various types.

Recipient devices 120-135 can be any of a number of possible communication devices. For example, recipient devices can be cell phones, land line telephones, Personal Digital Assistants (PDAs), any of a variety of wireless devices, Personal Computers (PCs), etc. Regardless of the exact types of devices, recipient devices 120-135 can be communicatively coupled with service provider system 105 via typical communication media such as a cellular network, a land line telephone, a Local Area Network (LAN), Wide Area Network (WAN), the Internet, and/or other types of networks. Through this communication media recipient devices 120-135 can send and receive communications to and from the service provider system 105.

Importantly, while referred to herein as a recipient device or an initiating device for the sake of explanation, any device coupled with the service provider system 105 can potentially, at various times, act as either an initiating device or a recipient device. For example, a particular cell phone may at one point initiate a call but at another time may receive a call. Therefore, the labels of initiating device and recipient device are illustrative only and indicate only a particular device's function at a specific point in time rather than indicating any limits on its functionality overall.

In use, a local perspective defined by a user of one of the end devices, such as initiating end device 110 can be read. In some cases, the local perspective can comprise a currently active perspective, i.e., a perspective currently being used or viewed by the user of the end device. Alternatively, the local perspective may be a perspective saved on the initiating device 110. The local perspective can be saved in a central repository, such as user profile database 115, as a common perspective. As will be seen, such a perspective, once saved in the user profile database 115, can be used as a common perspective by other end devices such as recipient end devices 125-135. As introduced above, the one or more common perspectives can define a manner in which the recipient devices 125-135 can present data of one or more types. For example, one common perspective may be used to arrange any of a variety of messages, such as emails, instant messages, phone call logs, etc., in chronological order and display them in a common view. Another common perspective may provide a view of the same or other data but arranged by sender or by subject.

According to a further embodiment, prior to saving the local perspective in the user profile database 115, the user of the initiating end device 110 can be queried as to whether to save the local perspective as a common perspective. In such a case, a response can be received by the initiating end device 110 from the user indicating whether to save the local perspective in the user profile database 115 as a common perspective and the local perspective can be saved in the user profile database 115 as a common perspective in response to the user response. That is, the user can be queried for permission and the perspective can be saved if the user approves.

Alternatively, the user of the initiating end device 110 may be provided any of a wide variety of other user interfaces and/or interactions for defining, selecting, and/or indicating which, if any, local perspectives of the initiating device 110 are to be saved in the user profile database 115 and made available as common perspectives. For example, the user of the initiating device 110 may be presented with a menu or other graphical or non-graphical interface for defining and/or selecting from among previously or currently defined perspectives. Again, the interface used can vary widely and may depend, at least in part, on the type of initiating end device 110 being used.

Alternatively or additionally, some or all of the common perspectives of the user profile database 115 may comprise default or standard common perspectives. That is, some of the common perspectives may be provided by, for example, the service provider as a set of common perspectives the users can select from.

Any one or more of the recipient devices 125-135 can read one or more common perspectives from a central repository such as the user profile database 115. The recipient end devices will probably, but not necessarily, belong to the same user as the initiating end device. That is, the user of the initiating end device 110 can save common perspectives in the user profile database 115 associated with that user and made available to other devices associated with that user. So, a user can set a common perspective using his laptop and make this perspective available to his cell phone, PDA, etc. Alternatively or additionally, a user may be able to share perspectives with other users. In such a case the user may be able to define, for each, all, or some subset of all common perspectives in the user profile database and associated with that user, which other users can access the perspective(s). Such associations can be made, for example, by storing one or more addresses, user identifiers, or other information with each common perspective that can be searched or otherwise checked when a device checks for available common perspective.

According to one embodiment, a determination can be made as to whether one or more common perspectives are available. That is, the end device 135 can check the user profile database 115 to see if any common perspectives are available for use. Alternatively or additionally, a determination can be made as to whether multiple common perspectives are available. Common perspectives that can be considered available to an end device 135 or user may be those perspectives that are defined as default or standard common perspectives, those common perspectives saved in the user profile database 115 by the user of the end device 135, those common perspectives indicated by some identifier associated therewith indicating availability to that user, etc.

In response to determining that one or more common perspectives are available, an indication of each of the common perspectives can be presented by the end device 135 to a user for selection of one or more of the common perspectives. That is, the end device 135 may present the available common perspectives in a menu or other type of interface to the user for selection of one or more of the perspectives to be applied. A user selection of one or more common perspectives from available common perspectives can be read and the user selected common perspectives can be applied to selected data by the end device 135. That is, the one or more common perspectives can be applied to selected data which can then be presented consistent with the one or more common perspectives. According to another embodiment, applying the one or more common perspectives to the selected data can comprise performing a search on the selected data using one or more criteria provided by the one or more common perspectives. In other words, the perspective can comprise one or more search terms that can be applied to selected data by the end device to order and/or identify data for presentation to the user. In some cases, prior to applying the one or more common perspectives, the selected data can also be read from the central repository. That is, the data may be saved remotely in the user profile database 115, may be local to the end device 135, or may be stored, in whole or in part, in any one or more other locations.

Alternatively, another architecture that provides support for communications between a number of different devices of different types may be used to provide the same functions. Such an architecture is described in the above referenced, co-pending U.S. patent application titled "Cross Platform Support for a Variety of Media Types." While not necessary to implement various embodiments of the present invention, such an architecture is considered useful with embodiments of the present invention since it provides a communication bus that in turn provides a common representation, in the form of a number of common language messages, of services or information available to, from, and between end devices regardless of the type of end device or the server providing or receiving the information or service. For example, one of these common language messages can be used to request a communication from an initiating end device or initiate a communication with a recipient device. Furthermore, the architecture includes a central user profile database that can be used to store information related to media types, device types, etc. An overview of this architecture is now provided for convenience.

Figure 2:
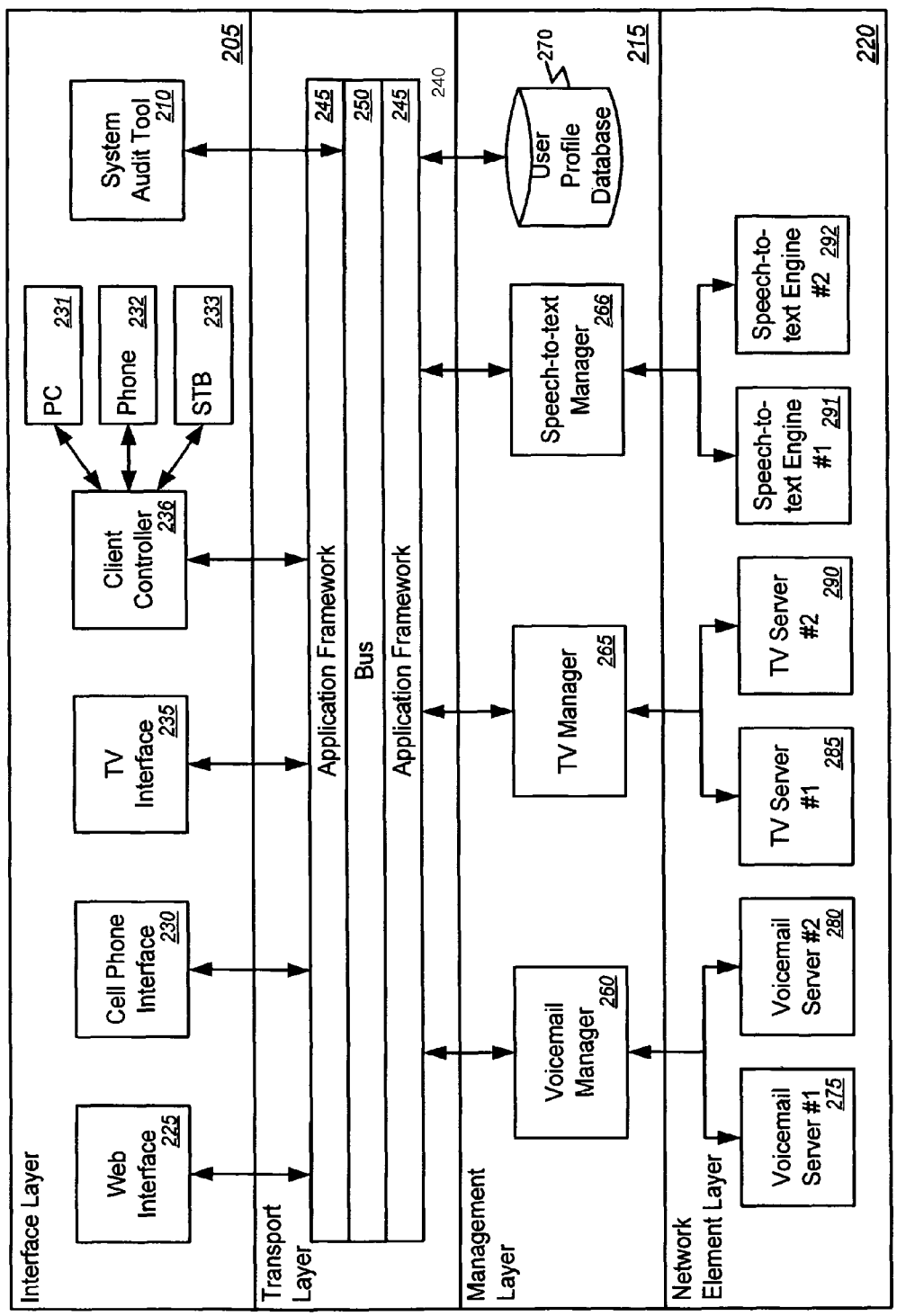
FIG. 2 is a block diagram illustrating functional component of an architecture for providing common perspectives to multiple end devices of potentially diverse types according to an alternative embodiment of the present invention.

FIG. 2 is a block diagram illustrating functional component of an architecture for providing common perspectives to multiple end devices of potentially diverse types according to an alternative embodiment of the present invention. In this example, the architecture is logically divided into four layers 205-220. The layers 205-220 include a network element layer 220, a management layer 215, a transport layer 210, and an interface layer 205. As will be seen, elements of each layer 205-220 can be communicatively coupled with elements of the next layer 205-220. So, elements of the network element layer 220 can be communicatively coupled with elements of the management layer 215 which in turn can be communicatively coupled with elements of the transport layer 210, etc.

The network element layer 220 can comprise one or more servers 275-292. The servers 275-292 of the network element layer 220 can each provide content and/or services of one or more types. For example, one or more servers 275 and 280 may provide voicemail services while one or more other servers 285 and 290 provide television (TV) services, while yet other servers 291 and 292 provide speech-to-text services, etc. Importantly, while this example shows a limited number of servers 275-292 in the network element layer 220, many more servers, providing a wide range of content or services of various types may be included. For example, one or more servers may be included for providing Internet services, Email services, and various other types of data, communication, and/or entertainment services.

The management layer 215 can comprise one or more managers 260-266. Each manager 260-266 can be communicatively coupled with one or more of the servers 275-292 of the network element layer 220. For example, voicemail manager can be coupled with voicemail servers 275 and 280 while TV manager 265 can be coupled with TV servers 285 and 290. Importantly, while managers 260-266 and servers 275-292 are shown and described herein as being organized by or arranged per service, other arrangements are contemplated and considered to be within the scope of the present invention.

According to one alternative, the managers 260-266 and the servers 275-292 may be arranged by company or provider. So, for example, one manager may be coupled with and provide access to the services and content provided by the servers of company A while another manager may be coupled with and provide access to the services and content provided by the servers of company B. However, an arrangement of managers 260-266 and servers 275-292 based on service and/or content type may be preferable since, as will be seen, such an arrangement can provide for easier extensibility of the system when adding features or services.

Furthermore, as noted above, additional servers may be used in the network element layer providing additional services and/or content of different types. Therefore, more, fewer, or different managers than shown in this example may be used in an actual implementation. For example an additional manager may be used for interfacing with one or more servers providing Internet services or email services. In another example, one or more managers may be communicatively coupled with one or more servers tracking billable events on the architecture. That is, one manager may track calls, messages, events, or pay-per-view or other content billed on a per-use basis so that the appropriate users can be billed by the operator of the architecture, the provider of the content, and/or other parties.

Regardless of the exact number, nature, or organization of the servers 275-292 and managers 260-266, the managers 260-266 can be adapted to translate content of the servers 275-292 with which the manager 260-266 is connected from the media types of the servers 275-292 to one or more common language messages. That is, the managers 260-266 can provide translation from a service specific format to a common or generic format. For example, voicemail server #1 275 and voicemail server #2 280 may be operated by different entities and offer different information in different formats that may be completely incompatible with each other. However, voicemail manager 260 provides for translating these different functions, formats, etc into a common language message that can be used by all other elements of the architecture.

According to one embodiment of the present invention, the managers 260-266 can provide defined interfaces to the servers 275-292 of the network element layer 220. By using calls, invocations, requests, or other signals or messages to the managers 260-266, the servers 275-292 can pass content or messages to the managers 260-266 for translation to a common language message for transmission to another element of the architecture. For example, voicemail manager 260 may provide an Application Program Interface (API) for use by any voicemail server 275 and 280 connected with the voicemail manager 260. Voicemail servers 275 and 280 can then use API calls to the voicemail manager 260 to initiate services, pass content or other information, and/or otherwise communicate with the voicemail server 260. According to one embodiment of the present invention, calls to the API or other interface may be closely analogous to the common language messages generated by the manager. For example, the manager may generate "InitiateCommunication" message to initiate a communication. The manager's API may also provide a "InitiateCommunication" or other similar call to the servers to which it is connected through which the servers can initiate a communication.

While use of an API or other defined interface between the managers 260-266 and the servers 275-292 is not required, it may be preferred since, by using an API or other type of defined interface, the managers 260-266 can be easily extended or modified as services and/or content of the servers are added or changed or as new servers are added. That is, the use of a defined interface such as an API allows greater extensibility since the only changes made at the manager would be to add or modify an appropriate "stub," module, or routine to add a new server, service, or content type without a need to make wholesale changes or re-write the managers.

According to one embodiment of the present invention, the manager and the API or interface of the manager may be implemented using object-oriented programming techniques. In such a case, the manager API calls made by the servers can cause the stub or module of the manager interfacing with the server to instantiate an object of a particular class type, such as a "InitiateCommunication" object, with properties representing, among other possibilities, the content of data to be communicated, the intended recipient(s), etc. Such an object or common language message may be defined in a common format readable by other elements of the architecture. For example, the object may be defined in an extensible Markup Language (XML) file. The manager can then transmit this object or common language message to any or all of the other elements of the architecture via the transport layer 210.

The transport layer 210 can comprise a communications bus 250 communicatively coupled with each of the managers 260-266. The bus 250 can be adapted to receive and transport the one or more common language messages from the managers 260-266. The transport layer 210 can also comprise an optional application framework 245 interposed between the end devices 225-236 of the interface layer 205 and the communications bus 250 and between the managers 260-266 and the communications bus 250. Generally speaking, the application framework 245 provides for monitoring and tracking of the common language messages placed on the bus 250 of the transport layer 210.

Regardless of whether the application framework 245 is used, the bus 250 of the transport layer 210 comprises a common representation of data that is usable by all elements of the architecture. Furthermore, the bus 250 provides this message to any or all devices in the architecture as appropriate regardless of the type of device.

According to one embodiment of the present invention, the bus 250 may also be implemented using object-oriented programming techniques. In such a case, a manager placing or sending a common language message on the bus 250 can call or invoke an API or other interface of the bus 250 or otherwise cause the instantiation of an object of a particular class type, such as a "InitiateCommunication" object, with properties representing, among other possibilities, the content of data to be communicated, the intended recipient(s), etc. The bus can then make this object or common language message available to any or all of the other elements of the architecture.

The interface layer 205 of the architecture can comprise one or more end devices 225-236 of different types. For example, the end devices 225-236 can represent a cell phone interface 230, a web interface 225, a TV interface 235, or a client controller 236 all potentially operating on different platforms with different operating systems. Each end device 225-236 can be communicatively coupled with the bus 250 of the transport layer, either directly or via the application framework 245, and can be adapted to receive and translate the common language messages to a format specific to the end device based on its type.

Alternatively or additionally, one or more of the end devices may comprise a client controller 236 communicatively coupled with the bus 250 of the transport layer 210 and one or more other end devices 231-233 such as a personal computer 231, television Set-Top Box (STB) 233 for television service, telephone 232, or other type of device. If used, the client controller 236 can be adapted to receive common language messages from the bus 250, translate content from the common language messages to a format specific to the end device(s) 231-233 for which it is intended, and deliver the device specific message to the device or devices. In some cases, the client controller 236 may also be adapted to act as a firewall for end devices 231-233 communicating via the bus 250 of the transport layer 210.

Therefore, the end devices 225-236 can translate from the common language messages, such as an XML message, to device specific representations of the information in that message for presentation to user in whatever format that device uses. According to one embodiment, the translation functions of the end devices can also be implemented using object-oriented programming techniques. In such a case, the end devices receive the common language messages such as XML encoded representations of the objects on the bus 250 of the transport layer 210. Translation can therefore comprise instantiating on the end device an object of the class indicated by the message with the properties indicated by the message thereby translating the properties of the object on the bus to a presentation language of the device.

Thus far, the description of the architecture has focused on messages from the servers 275-292 to the end devices 225-236. However, the end devices 225-236 can also be adapted to generate one or more common language messages based on user input and send the one or more common language messages to one or more of the managers 260-265 via the bus 250. For example, a cell phone 230 or other end device 225-236 can generate a "InitiateCommunication" message to be sent to any or all of the managers 260-265 or even to another end device. Therefore, the managers 260-265 can be further adapted to receive the common language messages from the end devices 225-236 via the bus 250 and to translate the common language messages to content of the media type of the servers 275-292 with which the manager 260-266 is connected.

According to one embodiment of the present invention, the architecture can include a user profile database 270 communicatively coupled with the bus 250 of the transport layer. The user profile database 270 can be adapted to maintain records of a set of user preferences for one or more of the end devices 225-236 of the interface layer 205. For example, TV or cell phone settings or options for a particular device and/or a particular user can be stored in the user profile database 270 for retrieval by one or more of the end devices 225-236 or one or more of the managers 260-266. Therefore, the user profile database 270 can be adapted to provide the preferences to one or more of the end devices 225-236 or one or more of the managers 260-266 in response to a common language message received via the bus 250. According to one embodiment and as will be discussed in detail below, user preference information can comprise one or more common perspectives available to any, all, or some subset of all of the end devices 225-236 of the interface layer 205.

According to another embodiment of the present invention, the architecture can further comprise a system audit tool 240 communicatively coupled with the bus 250 of the transport layer 210. The system audit tool 240 can be adapted to monitor common language messages on the bus 250.

Therefore, in use, the bus 250 provides a common representation of services or information available to, from, and between the end devices 225-236 regardless of the type of end device or the server providing or receiving the information or service. This common representation is in the form of a number of common language messages. The type, number, format, etc. of the common language messages can vary widely depending upon the exact implementation without departing from the scope of the present invention. However, for illustrative purposes only, some exemplary messages will be described.

According to one embodiment, the common language messages can include a "InitiateCommunication" request message indicating a request to initiate a communication. Similarly, the common language messages can include a "InitiateCommunication" response message acknowledging initiation of a communication. According to another embodiment, the common language messages can include a "Call Information" request indicating a request for information relating to a communication and a "Call Information" response providing requested information. The common language messages can also include a "Call Event Notification" message indicating the occurrence of a communication.

In some cases, the common language messages can include an "Update Profile" message indicating a change to one or more user defined preferences. As indicated above, such a message can be useful in updating one or more entries in the user profile database 270 or in one or more servers 275-292 of the network element layer 220. Furthermore, such a message may be useful in informing other devices of a change. Alternatively or additionally, the common language messages may also include, according to one embodiment, a "GetUserProfile" request message used to request user preference information from the user profile database 270 and/or one or more servers 275-292 of the network element layer 220. In such a case, the common language messages may also include a "GetUserProfile" response message that, as will be seen, can be used to respond to a "GetUserProfile" request message with general and/or specific preference information for one or more end devices 225-236 of the interface layer 205.

The various types of message can take any of a variety of possible formats without departing from the scope of the present invention. However, for illustrative purposes only, an exemplary format for a message may be considered to include a header and a body. The header may include information such as any or all of: an address or other indication of the device or devices for which the message is intended; an address or other indication of the device originating the message; an indication of the message type; an indications of the type of contents in the message; etc. The message body may include information such as representation of or actual content to be transferred. Therefore, the body can contain an email message, an audio or video file, a hyperlink or other direction to a location of the actual content, a list or other corpus of preference information etc. However, once again, the exact format of the common language messages can vary widely depending on the exact implementation.

Regardless of the exact format, translating content to a common language message or generating a common language message can comprise generating a file, such as an XML file, of the appropriate format to indicate the type of message and the end devices for which it is intended and possibly an indication of the contents. Alternatively, as indicated above, various components of the architecture may be implemented using object-oriented programming techniques. In such a case, generating a common language message can comprise instantiating an object of a particular class type, such as a "GetUserProfile" object, with properties representing, among other possibilities, the content of data to be communicated, the intended recipient(s), etc.

In use, a local perspective defined by a user of one of the end devices, such as end device 225 can be read. In some cases, the local perspective can comprise a currently active perspective, i.e., a perspective currently being used or viewed by the user of the end device. Alternatively, the local perspective may be a perspective saved on the end device 225. The local perspective can be saved in a central repository, such as user profile database 270, as a common perspective. Saving the perspective in the user profile database can be accomplished by the end device 225 issuing a common language message such as an "UpdateProfile" message as described above or other message which, when issued on the bus 210 by the end device 225 causes the user profile database 270 to save the perspective contained in or indicated by the message.

As will be seen, such a perspective, once saved in the user profile database 270, can be used as a common perspective by other devices such as devices 230-236. As introduced above, the one or more common perspectives can define a manner in which the devices 230-236 can present data of one or more types. For example, one common perspective may be used to arrange any of a variety of messages, such as emails, instant messages, phone call logs, etc., in chronological order and display them in a common view. Another common perspective may provide a view of the same or other data but arranged by sender or by subject.

According to a further embodiment, prior to saving the local perspective in the user profile database 270, the user of the initiating end device 225 can be queried as to whether to save the local perspective as a common perspective. In such a case, a response can be received by the initiating end device 225 from the user indicating whether to save the local perspective in the user profile database 270 as a common perspective and the local perspective can be saved in the user profile database 270 as a common perspective in response to the user response. That is, the user can be queried for permission and the perspective can be saved if the user approves. Alternatively, the user of the initiating end device 225 may be provided any of a wide variety of other user interfaces and/or interactions for defining, selecting, and/or indicating which, if any, local perspectives of the initiating device 225 are to be saved in the user profile database 270 and made available as common perspectives. For example, the user of the initiating device 225 may be presented with a menu or other graphical or non-graphical interface for defining and/or selecting from among previously or currently defined perspectives. Again, the interface used can vary widely and may depend, at least in part, on the type of initiating end device 225 being used.

Alternatively or additionally, some or all of the common perspectives of the user profile database 270 may comprise default or standard common perspectives. That is, some of the common perspectives may be provided by, for example, the one or more of the managers 260-266 or servers 275-292 as a set of common perspectives the users can select from.

Any one or more of the devices 230-236 can read one or more common perspectives from a central repository such as the user profile database 270. Reading a common perspective from the user profile database 270 can be accomplished by an end device 230 issuing a common language message, such as the "GetUserProfile" message described above or other common language message that, when sent to the user profile database 270 from the cell phone interface 230 via the bus 250, causes the user profile database 270 to lookup or otherwise locate one or more common perspectives associated with the end device or user identified by the message and return the perspective(s) or an indication of the perspective(s), such a pointer, address, etc, to the cell phone interface 230 via the bus 250.

The end device 230 reading the common perspective will probably, but not necessarily, belong to the same user as the initiating end device 225. That is, the user of the initiating end device 225 can save common perspectives in the user profile database 270 associated with that user and made available to other devices associated with that user. So, a user can set a common perspective using his laptop and make this perspective available to his cell phone, PDA, etc. Alternatively or additionally, a user may be able to share perspectives with other users. In such a case the user may be able to define, for each, all, or some subset of all common perspectives in the user profile database 270 and associated with that user, which other users can access the perspective(s). Such associations can be made, for example, by storing one or more addresses, user identifiers, or other information with each common perspective that can be searched or otherwise checked when determining available common perspective.

According to one embodiment, a determination can be made as to whether one or more common perspectives are available. That is, the end device 230, one of the managers 260-266, or the user profile database 270 can perform a search, look up or other operation to determine if any common perspectives are available for use. Alternatively or additionally, a determination can be made as to whether multiple common perspectives are available. Common perspectives that can be considered available to an end device 230 or user may be those perspectives that are defined as default or standard common perspectives, those common perspectives saved in the user profile database 270 by the user of the end device 230, those common perspectives indicated by some identifier associated therewith indicating availability to that user, etc.

In response to determining that one or more common perspectives are available, an indication of each of the common perspectives can be presented by the end device 230 to a user for selection of one or more of the common perspectives. That is, the end device 230, in response to receiving the common perspective(s) or indications of the common perspective(s) from the user profile database 270, may present the available common perspectives in a menu or other type of interface to the user for selection of one or more of the perspectives to be applied. A user selection of one or more common perspectives from available common perspectives can be read and the user selected common perspectives can be applied to selected data by the end device 230. That is, the one or more common perspectives can be applied to selected data which can then be presented consistent with the one or more common perspectives. According to another embodiment, applying the one or more common perspectives to the selected data can comprise performing a search on the selected data using one or more criteria provided by the one or more common perspectives. In other words, the perspective can comprise one or more search terms that can be applied to selected data by the end device to order and/or identify data for presentation to the user. In some cases, prior to applying the one or more common perspectives, the selected data can also be read from the user profile database 270 or other location. That is, the data may be saved remotely in the user profile database 270, may be local to the end device 230, or may be stored, in whole or in part, in any one or more other locations such as managers 260-266, servers 275-292, etc.

Figure 3:
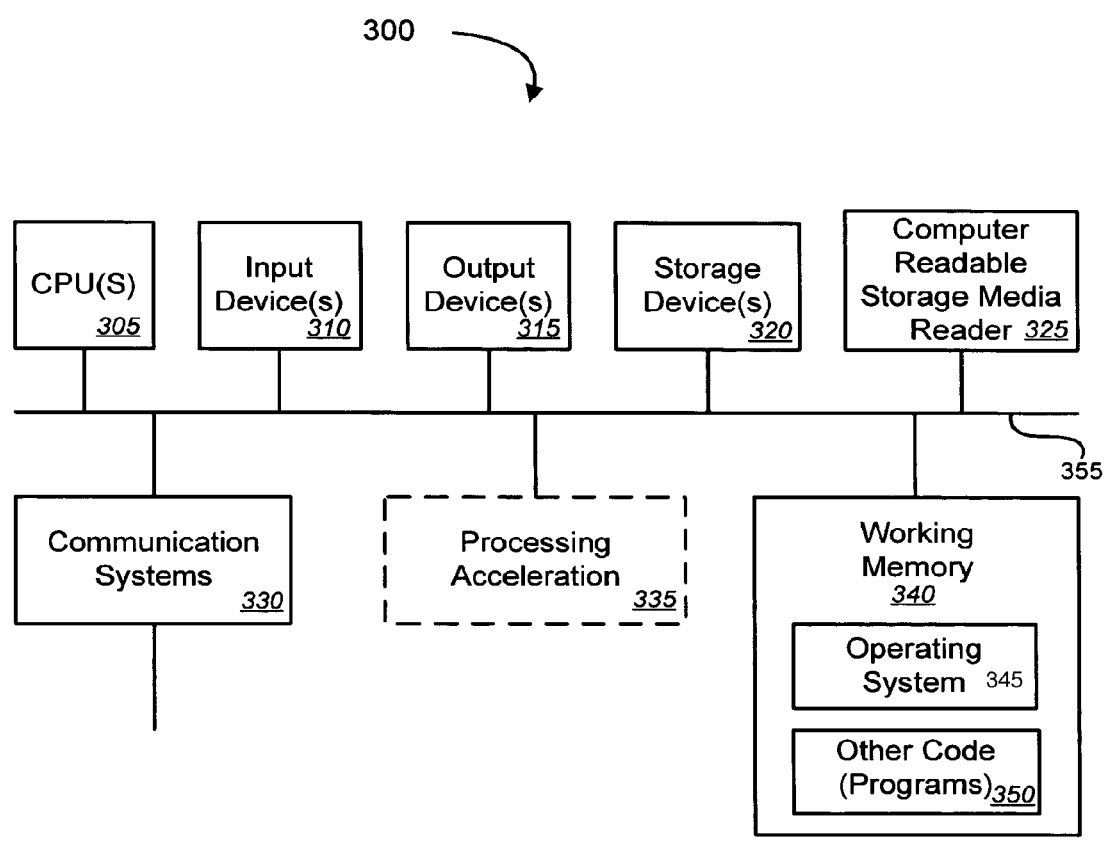
FIG. 3 is a block diagram illustrating an exemplary computer system in which embodiments of the present invention may be implemented.

FIG. 3 is a block diagram illustrating an exemplary computer system in which embodiments of the present invention may be implemented. This example illustrates a computer system 300 such as may be used, in whole, in part, or with various modifications, to provide a server, manager, end device, system audit tool or other system providing function such as those discussed above.

The computer system 300 is shown comprising hardware elements that may be electrically coupled via a bus 355. The hardware elements may include one or more central processing units (CPUs) 305, one or more input devices 310 (e.g., a mouse, a keyboard, etc.), and one or more output devices 315 (e.g., a display device, a printer, etc.). The computer system 300 may also include one or more storage device 320. By way of example, storage device(s) 320 may be disk drives, optical storage devices, solid-state storage device such as a random access memory ("RAM") and/or a read-only memory ("ROM"), which can be programmable, flash-updateable and/or the like.

The computer system 300 may additionally include a computer-readable storage media reader 325, a communications system 330 (e.g., a modem, a network card (wireless or wired), an infra-red communication device, etc.), and working memory 340, which may include RAM and ROM devices as described above. In some embodiments, the computer system 300 may also include a processing acceleration unit 335, which can include a DSP, a special-purpose processor and/or the like.

The computer-readable storage media reader 325 can further be connected to a computer-readable storage medium, together (and, optionally, in combination with storage device (s) 320) comprehensively representing remote, local, fixed, and/or removable storage devices plus storage media for temporarily and/or more permanently containing computer-readable information. The communications system 330 may permit data to be exchanged with the network 320 and/or any other computer described above with respect to the system 300.

The computer system 300 may also comprise software elements, shown as being currently located within a working memory 340, including an operating system 345 and/or other code 350. It should be appreciated that alternate embodiments of a computer system 300 may have numerous variations from that described above. For example, customized hardware might also be used and/or particular elements might be implemented in hardware, software (including portable software, such as applets), or both. Further, connection to other computing devices such as network input/output devices may be employed.

Software of computer system 300 may include code 350 for implementing any or all of the function of the various elements of the architecture as described herein. For example, software, stored on and/or executed by a computer system such as system 300, can provide the functions of the system audit tool, a manager, an end device, etc. Methods implemented by software on some of these components will be discussed in detail below.

Figure 4:
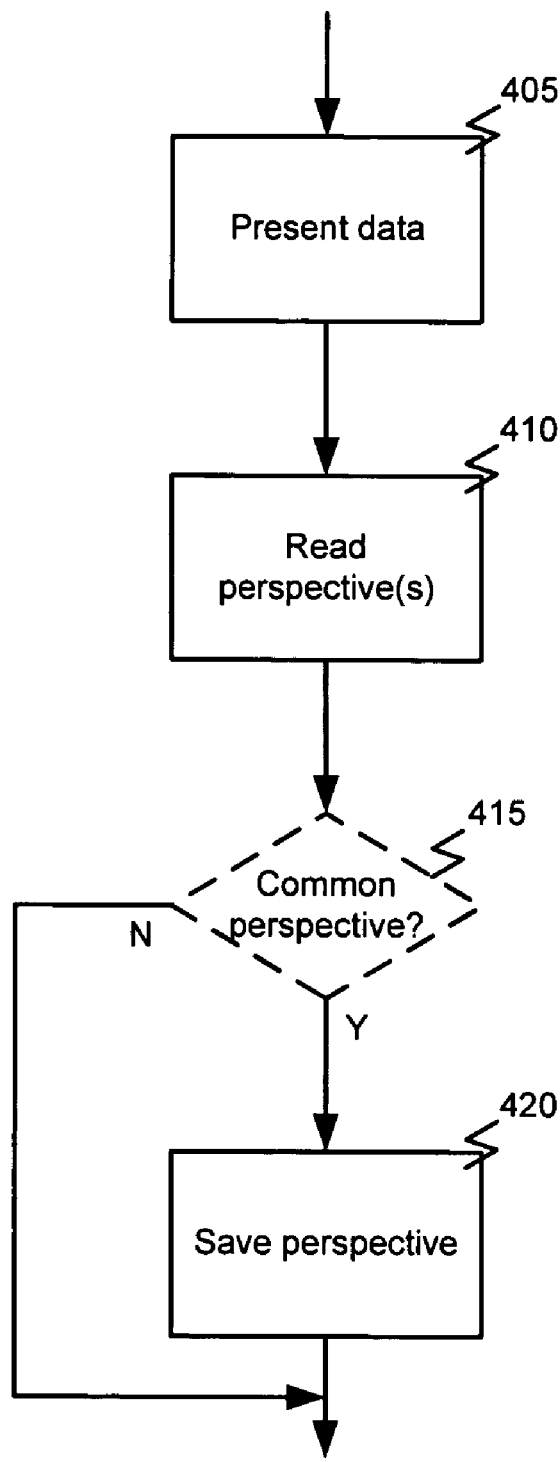
FIG. 4 is a flowchart illustrating a process for setting common perspectives for use by multiple end devices of potentially diverse types according to one embodiment of the present invention.

FIG. 4 is a flowchart illustrating a process for setting common perspectives for use by multiple end devices of potentially diverse types according to one embodiment of the present invention. That is, this example illustrates a process by which an end device may store a common perspective for use by other end devices.

In this example, the process begins when the end device presents 405 some selected data to the user. That is, the end device is displaying or otherwise presenting some selected data to the user in a local perspective. Alternatively or additionally, the process can begin with the user of the end device initiating a process for defining or otherwise selecting a local perspective.

Once the local perspective has been provided, selected, or defined, the local perspective can be read 410 by the end device. Reading of the local perspective may occur automatically, when a perspective is used or defined or in response to some user operation. Optionally, the user can then be queried as to whether to save the local perspective as a common perspective 415. In such a case, the end device can receive a response from the user indicating whether to save the local perspective in the central repository as a common perspective and save 420 the local perspective in the central repository as a common perspective in response to the user response. Alternatively, newly defined local perspective can be automatically saved 420 as a common perspective. As noted above, saving 420 local perspective as a common perspective can be accomplished, according to one embodiment, by the end device issuing a common language message such as an "UpdateUserProfile" or other message that, when received by the user profile database, causes the user profile database to store the perspective contained in or indicated by the message. Furthermore, as discussed above, this message or separate message(s) may contain some indication of one or more users, including and/or in addition to the originating user, that may use the perspective as a common perspective.

Figure 5:
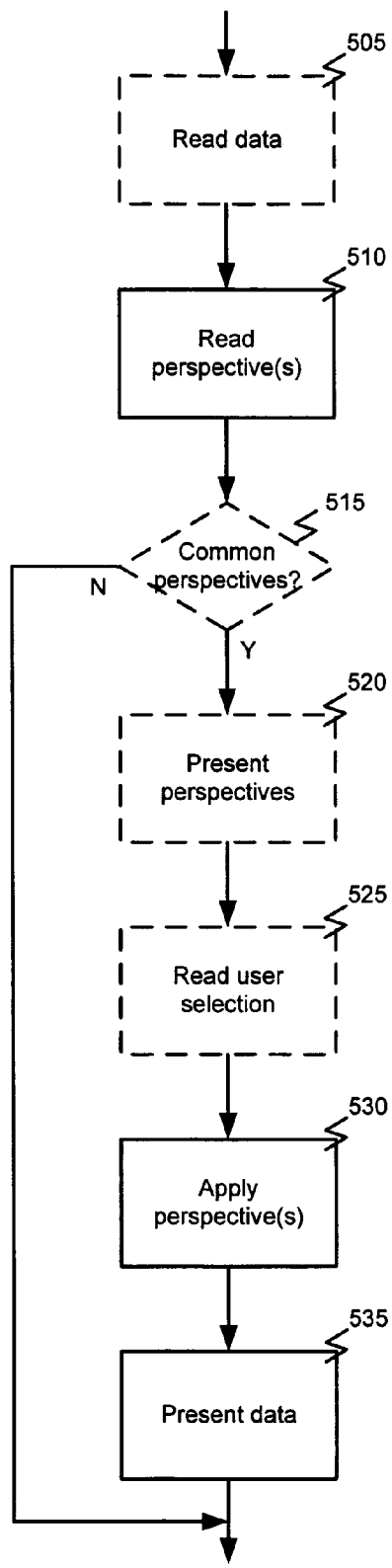
FIG. 5 is a flowchart illustrating a process for applying common perspectives to multiple end devices of potentially diverse types according to one embodiment of the present invention.

FIG. 5 is a flowchart illustrating a process for applying common perspectives to multiple end devices of potentially diverse types according to one embodiment of the present invention. That is, this example illustrates a process that may be used by an end device to read and use a common perspective. As discussed above, data to be presented using the common perspective can be stored locally by the end device or may be stored remotely in the user profile database, or another location. If stored remotely, the process can begin with optionally reading 505 the data to be presented. Alternatively, the common perspectives may, in some cases, be read even without or before the data is read by or available to the end device.

The end device can read 510 one or more common perspectives from a central repository, such as a user profile database as described above. Also as noted above, reading a common perspective can be accomplished, for example, by issuing a common language message, such as a "GetProfile" or other message that causes the user profile database to return common perspectives that are associated with or available to the user or device issuing the message.

According to one embodiment, an optional determination 515 can be made as to whether common perspectives are available. In response to determining 515 that common perspectives are available, an indication of each of the one or more common perspectives can be presented 520 to a user for selection of one or more of the common perspectives. A user selection of one or more common perspectives from available common perspectives can be read 525 and the user selected common perspectives can be applied to the selected data 530.

According to one embodiment, applying 530 the one or more common perspectives to the selected data can comprise performing a search on the selected data using one or more criteria provided by the one or more common perspectives. Finally, the selected data can be presented 535 in a manner consistent with the common perspective.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

While illustrative and presently preferred embodiments of the invention have been described in detail herein, it is to be understood that the inventive concepts may be otherwise variously embodied and employed, and that the appended claims are intended to be construed to include such variations, except as limited by the prior art.

What is claimed is:

1. A method of providing common perspectives of diverse data types to multiple end devices, the method comprising:
  receiving, from an end device, a local perspective of a data set, wherein the local perspective defines at least one formatting characteristic for presentation of the data set;
  storing the local perspective in a central repository as a common perspective;
  providing a user profile database to maintain at least one record of a set of user preferences;
  receiving, from a user of a requesting device, a signal requesting a selected data set from the central data; repository, the selected data set being one of a plurality of data sets, the plurality of data sets including data from one or more Internet services, data from one or more television services, and data from one or more messaging services;
  in response to the signal, reading the selected data set from the central data repository;
  reading one or more common perspectives associated with the user from the central repository, the one or more common perspectives defining a manner in which the requesting device will present the selected data set, wherein the selected data set comprises a plurality of messages, the plurality of messages including at least one voicemail message and at least one email message, and the one or more common perspectives define an order in which a list of the plurality of messages will be displayed;
  applying the one or more common perspectives to the selected data set;
  translating the selected data set into one or more common language messages using the one or more common perspectives applied to the selected data set: the one or more common language messages comprising a common language message comprising a header and a body; wherein the header comprises an indication of message origination, message type, and type of content; and
  the body comprises a representation of at least a portion of the selected data set to be transferred or at least a portion of the actual selected data set; and
  forwarding the one or more common language messages to the requesting device.

2. The method of claim 1, wherein applying the one or more common perspectives to the selected data set comprises performing a search on the selected data set using one or more criteria provided by the one or more common perspectives.

3. The method of claim 1, further comprising prior to applying the one or more common perspectives, reading the selected data set from the central repository.

4. The method of claim 1, further comprising determining whether one or more common perspectives are available.

5. The method of claim 4, further comprising in response to determining one or more common perspectives are available, presenting an indication of each of the one or more common perspectives to a user for selection of one or more of the one or more common perspectives.

6. The method of claim 5, further comprising reading a user selection of one or more common perspectives from available common perspectives.

7. The method of claim 6, wherein applying the one or more common perspectives to the selected data set comprises applying the user selected common perspectives to the selected data set.

8. The method of claim 1, further comprising:
reading a second local perspective defined by a user of one of the end devices; and
saving the second local perspective in the central repository as a common perspective.

9. The method of claim 8, wherein the second local perspective comprises a currently active perspective.

10. The method of claim 8, further comprising prior to saving the second local perspective in the central repository, querying the user as to whether to save the second local perspective as a common perspective.

11. The method of claim 10, further comprising receiving a response from the user indicating whether to save the second local perspective in the central repository as a common perspective, wherein saving the local perspective in the central repository as a common perspective is performed in response to the user response.

12. The method of claim 1, wherein generating the common language message comprises generating an extensible markup language (XML) file.

13. A computer-based system for providing common perspectives of diverse data types to multiple end devices, the system comprising:
an interface to receive, from a user of an end device, a local perspective of a data set, wherein the local perspective defines at least one formatting characteristic for presentation of the data set;
a central repository coupled to the interface to store the local perspective of a data set as a common perspective;
a user profile database coupled to the interface to maintain at least one record of a set of user preferences;
an interface to receive, from a user of a requesting device, a signal requesting a selected data set from the central data repository, the selected data set being one of a plurality of data sets, the plurality of data sets including data from one or more Internet services, data from one or more television services, and data from one or more messaging services;
a processing device which, in response to the signal:
reads the selected data set from the central data repository;
reads one or more common perspectives associated with the user from a central repository, the one or more common perspectives defining a manner in which the requesting device will present the selected data set; wherein the selected data set comprises a plurality of messages, the plurality of messages including at least one voicemail message and at least one email message, and the one or more common perspectives define an order in which a list of the plurality of messages will be displayed;
applies the one or more common perspectives to the selected data set;
translates the selected data set into one or more common language messages using the one or more common perspectives applied to the selected data set, the one or more common language messages comprising a common language message comprising a header and a body; wherein
the header comprises an indication of message origination, message type, and type of content; and
the body comprises a representation of at least a portion the selected data set to be transferred or at least a portion of the actual selected data set; and
forwards the one or more common language messages to the requesting device.

14. The system of claim 13, wherein the requesting device reads the selected data set from the central repository prior to applying the one or more common perspectives.

15. The system of claim 14, wherein the requesting device determines whether one or more common perspectives are available.

16. The system of claim 15, wherein the requesting device presents an indication of each of the one or more common perspectives to a user of the requesting device for selection of one or more common perspectives in response to determining one or more common perspectives are available.

17. The system of claim 16, wherein the requesting device reads a user selection of the one or more common perspectives from the available one or more common perspectives.

18. The system of claim 17, wherein the requesting device applies the one or more common perspectives by applying the user selected one or more common perspectives.

19. The system of claim 13, wherein the end device is further adapted to query the user of the end device as to whether to save the local perspective as a common perspective prior to saving the local perspective in the central repository.

20. The system of claim 19, wherein the end device is further adapted to receive a response from the user of the end device indicating whether to save the local perspective in the central repository as a common perspective, wherein the end device saves the local perspective in the central repository as a common perspective in response to the user response.

21. A non-transitory machine-readable medium having stored thereon a series of instructions that, when executed by a processor, cause the processor to provide common perspectives to multiple end devices by:
receiving, from a user of an end device, a local perspective of a data set, wherein the local perspective defines at least one formatting characteristic for presentation of the data set;
storing the local perspective in a central repository as a common perspective;
providing a user profile database to maintain at least one record of a set of user preferences;
receiving, from a user of a requesting device, a signal requesting a selected data set from the central data repository, the selected data set being one of a plurality of data sets, the plurality of data sets including data from one or more Internet services, data from one or more television services, and data from one or more messaging services;
in response to the signal, reading the selected data set from the central data repository;
reading one or more common perspectives associated with the user from the central repository, the one or more common perspectives defining a manner in which the requesting device will present the selected data set, wherein the selected data set comprises a plurality of messages, the plurality of messages including at least one voicemail message and at least one email message, and the one or more common perspectives define an order in which a list of the plurality of messages will be displayed;

applying the one or more common perspectives to the selected data set;

translating the selected data set into one or more common language messages using the one or more common perspectives applied to the selected data set, the one or more common language messages comprising a common language message comprising a header and a body; wherein the header comprises an indication of message origination, message type, and type of content; and the body comprises a representation of at least a portion of the selected data set to be transferred or at least a portion of the actual selected data; and forwarding the one or more common language messages to the requesting device.

22. The non-transitory machine-readable medium of claim 21, wherein applying the one or more common perspectives to the selected data set comprises performing a search on the selected data set using one or more criteria provided by the one or more common perspectives.

23. The non-transitory machine-readable medium of claim 21, further comprising prior to applying the one or more common perspectives, reading the selected data set from the central repository.

24. The non-transitory machine-readable medium of claim 21, further comprising determining whether one or more common perspectives are available.

25. The non-transitory machine-readable medium of claim 24, further comprising in response to determining multiple common perspectives are available, presenting an indication of each of the multiple common perspectives to a user for selection of one or more of the multiple common perspectives.

26. The non-transitory machine-readable medium of claim 25, further comprising reading a user selection of one or more common perspectives from the multiple available common perspectives.

27. The non-transitory machine-readable medium of claim 26, wherein applying the one or more common perspectives to the selected data set comprises applying the user selected one or more common perspectives to the selected data set.

28. The non-transitory machine-readable medium of claim 21, further comprising reading a second local perspective defined by a user of one of the end devices, and saving the second local perspective in the central repository as a common perspective.

29. The non-transitory machine-readable medium of claim 28, further comprising prior to saving the second local perspective in the central repository, querying the user as to whether to save the second local perspective as a common perspective.

30. The non-transitory machine-readable medium of claim 29, further comprising receiving a response from the user indicating whether to save the second local perspective in the central repository as a common perspective, wherein saving the second local perspective in the central repository as a common perspective is performed in response to the user response.

* * * * *